US012606653B2

(12) United States Patent
Jung et al.

(10) Patent No.: US 12,606,653 B2
(45) Date of Patent: Apr. 21, 2026

(54) RESIN COMPOSITION AND PREPARATION METHOD THEREFOR

(71) Applicant: KOLON INDUSTRIES, INC., Seoul (KR)

(72) Inventors: Hye Min Jung, Seoul (KR); Joong Suk Lee, Seoul (KR)

(73) Assignee: KOLON INDUSTRIES, INC, Seoul (KR)

( * ) Notice: Subject to any disclaimer, the term of this patent is extended or adjusted under 35 U.S.C. 154(b) by 976 days.

(21) Appl. No.: 17/771,786

(22) PCT Filed: Dec. 30, 2020

(86) PCT No.: PCT/KR2020/019433

§ 371 (c)(1),
(2) Date: Apr. 25, 2022

(87) PCT Pub. No.: WO2021/137631

PCT Pub. Date: Jul. 8, 2021

(65) Prior Publication Data

US 2022/0372183 A1 Nov. 24, 2022

(30) Foreign Application Priority Data

Dec. 31, 2019 (KR) ........................ 10-2019-0179171

(51) Int. Cl.

| | |
|---|---|
| ***C08F 112/08*** | (2006.01) |
| ***B60C 1/00*** | (2006.01) |
| ***C08F 112/12*** | (2006.01) |
| ***C08F 132/08*** | (2006.01) |
| ***C08L 15/02*** | (2006.01) |

(52) U.S. Cl.

CPC .......... *C08F 112/08* (2013.01); *B60C 1/0008* (2013.01); *C08F 112/12* (2013.01); *C08F 132/08* (2013.01); *C08L 15/02* (2013.01); *C08F 2810/40* (2013.01); *C08L 2205/03* (2013.01); *C08L 2207/324* (2013.01)

(58) Field of Classification Search

CPC .......... C08L 23/283; C08L 7/00; C08L 57/02; C08K 3/04; C08K 3/22; C08K 5/09; C08K 3/06; C08K 5/47; C08F 12/06; C08F 2/38

See application file for complete search history.

(56) References Cited

U.S. PATENT DOCUMENTS

| | | | | | |
|---|---|---|---|---|---|
| 8,981,013 | B2 | 3/2015 | Silvis | | |
| 11,008,443 | B2 | 5/2021 | Inoue | | |
| 2006/0280892 | A1* | 12/2006 | Davis | B29C 43/24 | 428/40.1 |
| 2013/0186539 | A1* | 7/2013 | Takahashi | B32B 27/322 | 428/215 |
| 2015/0057392 | A1* | 2/2015 | Koda | C08K 3/36 | 523/156 |
| 2016/0229800 | A1* | 8/2016 | Fornof | A61C 5/50 | |
| 2017/0292047 | A1* | 10/2017 | Sustic | C09J 123/14 | |
| 2019/0144643 | A1 | 5/2019 | Lee | | |

FOREIGN PATENT DOCUMENTS

| | | | |
|---|---|---|---|
| CN | 104411734 | A | 3/2015 |
| CN | 109320799 | A | 2/2019 |
| EP | 3438178 | A1 | 6/2018 |
| JP | H08-048723 | A | 2/1996 |
| JP | H11-130820 | A | 5/1999 |
| JP | 2009024101 | A | 2/2009 |
| JP | 2013-47037 | A | 3/2013 |
| JP | 2014024922 | A | 2/2014 |
| JP | 2016003296 | A | 1/2016 |
| JP | 2018012818 | A | 1/2018 |
| JP | 2019178190 | A | 10/2019 |
| JP | 2019218416 | A | 12/2019 |
| KR | 1020110067233 | A | 6/2011 |
| KR | 1020110072408 | A | 6/2011 |
| KR | 1020140075259 | A | 6/2014 |
| KR | 101513741 | B1 | 4/2015 |
| KR | 1020160081550 | A | 7/2016 |
| KR | 1020180080830 | A | 7/2018 |
| KR | 1020180127399 | A | 11/2018 |
| KR | 102047637 | B1 | 11/2019 |
| KR | 102183987 | B1 | 11/2020 |
| WO | 2018-143379 | A1 | 8/2018 |
| WO | 2021137631 | A1 | 7/2021 |

OTHER PUBLICATIONS

EP Search Report dated May 8, 2023.
JP Office Action dated May 9, 2023.
CN Office Action dated Dec. 16, 2023.
KR Office Action dated Feb. 12, 2020.
KR Notice of Allowance dated Aug. 21, 2020.
International Search Report dated Apr. 5, 2021.
Decision to Grant Issued By JPO.

* cited by examiner

*Primary Examiner* — Anthony J Frost
(74) *Attorney, Agent, or Firm* — Harvest IP Law, LLP

(57) ABSTRACT

The present disclosure relates to a rubber composition and a method of preparing the same, the rubber composition comprising a viscosity modifier and a modified polymer having a structure in which a molecular weight regulator is coupled to at least one of both ends of an at least partially hydrogenated or non-hydrogenated petroleum resin. The rubber composition according to the present disclosure has improved processability and thus may replace process oil, and may markedly improve gas impermeability.

11 Claims, No Drawings

RESIN COMPOSITION AND PREPARATION METHOD THEREFOR

CROSS REFERENCE TO RELATED APPLICATIONS

This application is a National Stage of International Application No. PCT/KR2020/019433 filed Dec. 30, 2020, claiming priority based on Korean Patent Application No. 10-2019-0179171 filed Dec. 31, 2019, the disclosure of which is incorporated herein by reference in its entirety.

TECHNICAL FIELD

The present disclosure relates to a resin composition and a method of preparing the same.

DESCRIPTION OF RELATED ART

A tire plays a role in keeping a vehicle moving by transmitting driving power, brake power, etc. of a vehicle engine to a road surface while supporting the weight of a vehicle and mitigating road impacts. Various requirements to be satisfied by a tire for a vehicle include durability, wear resistance, rolling resistance, fuel efficiency, handling stability, riding comfort, braking performance, reduced vibration, low noise, etc.

An inner liner of a tire is a rubber layer located inside the tire and plays an important role in maintaining pneumatic pressure and durability of the tire. The inner surface of the tire inner liner is filled with air or nitrogen, and portions that need to be filled with actual rubber may be replaced by the use such gases, which exhibit a similar level of elasticity to that of rubber and weighs little, thereby reducing the weight of the tire and increasing economic efficiency.

Therefore, butyl rubber having low air permeability is generally used in a rubber portion of an inner liner located inside a tire, and such butyl rubber is a useful material for suppressing high-pressure gases inside the tire from leaking out by closing the gaps between rubber.

In order to meet the requirement of high-level properties of a tire, various kinds of materials are inevitably used for a tire inner liner, and the use of various materials may be advantageous from the viewpoint of durability or strength of the tire inner liner. However, the use of various materials may be disadvantageous from the viewpoint of gas impermeability because traces of gases, even in extremely small quantities, leak out.

Gas impermeability may improve driving stability by maintaining pneumatic pressure of a tire at a constant level, and may improve durability of the tire by preventing thermal aging of the tire due to heat generated by air penetrating into the tire and dynamic deformation during driving. In addition, since it allows rolling resistance and an inner liner thickness to be reduced, to exhibit a fuel efficiency improvement effect through weight reduction, gas impermeability is one of most important physical properties of an inner liner.

In this regard, various materials have recently been developed to improve gas impermeability of a tire inner liner.

For example, Korean Patent Registration No. 10-1176929 discloses that gas impermeability of a tire inner liner is improved by employing an inner liner comprising a terpene resin and silicate, but problems still exist in that the degree of improvement in gas impermeability is not high and processability is poor.

Despite these various attempts, it is necessary to develop a rubber composition for a tire inner liner, which can improve gas impermeability of the tire inner liner and increase processability thereof.

PRIOR ART DOCUMENTS

Patent Documents

1. Korean Patent Publication No. 10-2018-0080830
2. Korean Patent Publication No. 10-2014-0075259
3. Korean Patent Publication No. 10-2011-0072408

CONTENT OF DISCLOSURE

Solution to Problem

Conventional techniques for improving gas impermeability include simply increasing a thickness of a rubber layer, increasing an amount of halogenated butyl rubber, and so on, but increasing a thickness of an inner liner, which occupies a largest proportion of the entire rubber of a tire, except for a tread portion and a sidewall portion, is directly linked to a reduction in fuel efficiency.

In addition, a tire inner liner could be mixed with only butyl rubber having excellent air impermeability, but, when the butyl rubber is used alone, processability in manufacturing a tire may be lowered and the manufacturing cost may rise.

In addition, because exclusive mixing (compounding) of butyl rubber for use in the tire inner liner is difficult, a proportion of natural rubber is increased in mixing, and rubber for an inner liner is mixed with other materials, including process oil, a processing aid, and fillers (organic and inorganic fillers), but use of the materials other than butyl rubber in mixing may adversely affect gas impermeability.

In this regard, in order to reduce gas permeability, the present inventors investigated a petroleum resin which can replace a process oil, an inorganic material and a homogeneously mixing agent.

As a result of investigation, the present inventors confirmed that the process oil can be entirely replaced, and processability and gas impermeability can be significantly improved by using a rubber composition for a tire inner liner comprising a petroleum resin modified with a molecular weight regulator and at least partially hydrogenated or non-hydrogenated, and a viscosity controller, and completed the present disclosure.

Therefore, aims of the present disclosure provide a modified polymer capable of improving processability and gas impermeability, a resin composition comprising the same, a tire inner liner using the same, and a method for preparing the same.

Solution to Problem

An aspect of the present disclosure relates to a resin composition comprising a modified polymer having a structure in which a molecular weight regulator is coupled to at least one of both ends of a petroleum resin that is at least partially hydrogenated or non-hydrogenated by a polymerization reaction.

An aspect of the present disclosure relates to a resin composition comprising a modified polymer according to various embodiments of the present disclosure and a viscosity controller.

An aspect of the present disclosure relates to a rubber composition comprising a resin composition according to various embodiments of the present disclosure.

An aspect of the present disclosure relates to a tire inner liner using a rubber composition according to various embodiments of the present disclosure.

An aspect of the present disclosure relates to a tire for a transport apparatus comprising a tire inner liner according to various embodiments of the present disclosure.

An aspect of the present disclosure relates to a transport apparatus comprising a tire according to various embodiments of the present disclosure.

An aspect of the present disclosure relates to a method for preparing a resin composition, the method comprising the step of obtaining a polymerization reaction product by performing a polymerization reaction by adding a polymerization catalyst or/and heat to a solution comprising one or more monomers derived from $C_5$ fractions, one or more monomers derived from $C_9$ fractions, one or more monomers selected from a cyclic diolefin monomer and a linear olefin monomer, and a molecular weight regulator.

Advantageous Effects of Disclosure

By including a low-viscosity aromatic hydrocarbon-based resin, the rubber composition according to the present disclosure performs a function similar to that of process oil and thus is advantageous from the viewpoint of economic efficiency by facilitating dispersion of raw materials and shortening a mixing time.

In addition, the rubber composition comprising a resin composition modified by a molecular weight regulator according to the present disclosure and having an at least partially hydrogenated or non-hydrogenated petroleum resin and a viscosity controller is advantageous in that processability and gas impermeability of an inner liner can be both improved.

In addition, the rubber composition according to the present disclosure may satisfy basic physical properties required in forming a tire, which include a tensile strength, wear resistance, durability, hardness, etc., and can be applied and employed to a tire inner liner.

DETAILED DESCRIPTION

Hereinafter, as the present inventive concept allows for various changes and numerous embodiments, particular embodiments will be illustrated in the drawings and described in detail in the detailed description. However, this is not intended to limit the present inventive concept to particular modes of practice, and it is to be appreciated that all changes, equivalents, and substitutes that do not depart from the spirit and technical scope are encompassed in the present The terms used herein are merely used to describe particular embodiments, and are not intended to limit the present inventive concept. An expression used in the singular encompasses the expression of the plural, unless it has a clearly different meaning in the context. The terms "comprises" and/or "comprising," when used in this specification, specify the presence of stated features, integers, steps, operations, elements, parts, components, materials, or combinations thereof, but do not preclude the presence or addition of one or more other features, integers, steps, operations, elements, parts, components, materials, or combinations thereof. The symbol "/" used herein may be interpreted as "and" or "or" according to the context.

In the drawings, the thicknesses of layers and regions are exaggerated or reduced for clarity. Throughout the specification, like reference numerals refer to like elements. Throughout the specification, it is to be understood that when a component, such as a layer, a film, a region, or a plate, is referred to as being "on" another component, the component can be directly on the other component or intervening components may be present thereon. It will be understood that, although the terms "first," "second," etc. may be used herein to describe various elements, components, regions, layers and/or sections, these elements, components, regions, layers and/or sections should not be limited by these terms. These terms are only used to distinguish one element from another element.

Unless otherwise defined, all scientific terms used herein have the same meaning as commonly understood by one of ordinary skill in the art to which this inventive concept belongs.

In the present specification, "petroleum resin" is meant to include a polymer obtained by polymerization of one or more of a $C_5$ monomer, a mixed $C_5$ fraction, a $C_9$ monomer, a mixed $C_9$ fraction, a cyclic diolefin monomer, and a linear olefin monomer. For example, the petroleum resin may include a homopolymer, a copolymer, etc. Examples of the homopolymer petroleum resin may include a polymer obtained by polymerizing a $C_5$ monomer, a polymer obtained by polymerizing a mixed $C_5$ fraction, a polymer obtained by polymerizing a $C_9$ monomer, a polymer obtained by polymerizing a mixed $C_9$ fraction, a polymer obtained by polymerizing a cyclic diolefin monomer, and a polymer obtained by polymerizing a linear olefin monomer. Examples of the copolymer petroleum resin may include a copolymer obtained by polymerizing two different $C_5$ monomers, a copolymer obtained by polymerizing two different $C_9$ monomers, a copolymer obtained by polymerizing two different cyclic diolefin monomers, a copolymer obtained by polymerizing two different linear olefin monomers, a copolymer obtained by polymerizing a $C_5$ fraction and a $C_5$ monomer, a copolymer obtained by polymerizing a $C_5$ fraction and a $C_9$ monomer, a copolymer obtained by polymerizing a $C_9$ fraction and a $C_5$ monomer, a copolymer obtained by polymerizing a $C_5$ monomer and a $C_9$ monomer, a copolymer obtained by polymerizing a $C_9$ fraction and a $C_9$ monomer, a copolymer obtained by polymerizing a $C_5$ fraction and a linear olefin monomer, a copolymer obtained by polymerizing a $C_9$ fraction and a linear olefin monomer a copolymer obtained by polymerizing a $C_5$ fraction and a cyclic diolefin monomer, a copolymer obtained by polymerizing a $C_9$ fraction and a cyclic diolefin monomer, a copolymer obtained by polymerizing a $C_5$ monomer and a cyclic diolefin monomer, a copolymer obtained by polymerizing a $C_9$ monomer and a linear olefin monomer, and a copolymer obtained by polymerizing a cyclic diolefin monomer and a linear olefin monomer.

In the present specification, "hydrogenated petroleum resin" refers to a petroleum resin having at least some unsaturated moieties, such as ethylene, in the petroleum resin, modified to a saturated hydrocarbon by hydrogenation.

In the present specification, the "$C_5$ (mixed) fraction" includes aliphatic $C_5$ and $C_6$ paraffins, olefins and diolefins derived from cracking of naphtha. For example, the $C_5$ fraction may, but not limited to, include pentene, isoprene, 2-methyl-2-butene, 2-methyl-2-pentene, cyclopentadiene, and piperylene, and may include all of two or more mixtures of $C_5$ monomers. In addition, the $C_5$ fraction may be optionally alkylated.

In the present specification, the term "$C_5$ monomer" is used to indicate one of components contained in the above-described $C_5$ (mixed) fractions or derived from the fractions.

In the present specification, "$C_9$ (mixed) fraction" is a composition derived from petroleum processing, e.g., cracking, as commonly understood in the art, including $C_8$, $C_9$ and/or $C_{10}$ olefins boiled at atmospheric pressure and about 100-300° C., and examples thereof may include, but not limited to, vinyltoluene, α-methylstyrene, styrene, dicyclopentadiene, indene, trans-3-methylstyrene, methylindene, and mixtures of two or more of the $C_9$ monomers. In addition, the $C_9$ fraction may be optionally alkylated. For example, in the present disclosure, the $C_9$ fraction may include vinyltoluene, indene, styrene, dicyclopentadiene, alkylated derivatives thereof, e.g., α-methylstyrene, methylindene, etc.

In the present specification, "$C_9$ monomer" is meant to indicate one of components contained in the above-described $C_9$ (mixed) fractions or derived from the fractions.

In the present specification, "olefin" is meant to include a unsaturated compound having at least one ethylenically unsaturated (C═C) bond. Examples of the olefin may include, but not limited to, linear olefin, cyclic olefin, α-olefin, etc.

In the present specification, "cyclic diolefin" is meant to include a cyclic unsaturated compound having two C═C bonds. Examples of the cyclic diolefin may include, but not limited to, dicyclopentadiene, tricyclopentadiene, etc.

Hereinafter, various aspects and embodiments of the present disclosure will be described in greater detail.

An aspect of the present disclosure relates to a method for preparing a resin composition, the method comprising the step of obtaining a polymerization reaction product by performing a polymerization reaction by adding a polymerization catalyst or/and heat to a solution comprising one or more monomers derived from $C_5$ fractions, one or more monomers derived from $C_9$ fractions, one or more monomers selected from a cyclic diolefin monomer and a linear olefin monomer, and a molecular weight regulator.

In addition, the solution may further comprise a viscosity controller.

The viscosity controller performs a function of adjusting viscosities of a reactant and a product without involvement in formation of the structure of a polymer as a product, and thus a polymerization reaction product according to the present disclosure obtained by performing a polymerization reaction by adding a polymerization catalyst or/and heat to a solution comprising one or more monomers derived from $C_5$ fractions, one or more monomers derived from $C_9$ fractions, one or more monomers selected from a cyclic diolefin monomer and a linear olefin monomer, a molecular weight regulator, and a viscosity controller may be a mixture of a modified polymer and a viscosity controller.

The solution may include one or more $C_9$ monomers derived from the $C_9$ fraction.

According to an embodiment, the 'one or more $C_9$ monomers' are compositions derived from petroleum processing, e.g., cracking, as commonly understood in the art, including $C_8$, $C_9$ and/or $C_{10}$ olefins boiled at atmospheric pressure and about 100-300° C.

According to an embodiment, the one or more $C_9$ monomers may include vinyltoluene, α-methylstyrene, styrene, dicyclopentadiene, indene, and methylindene. In addition, the $C_9$ monomers may be optionally alkylated. For example, in the present disclosure, the one or more $C_9$ monomers may include vinyltoluene, indene, styrene, dicyclopentadiene, alkylated derivatives thereof, e.g., α-methylstyrene, methylindene, etc.

According to an embodiment, the molecular weight regulator useful in the present disclosure may be a chain transfer agent, and examples thereof may include thiols or halocarbons, such as carbon tetrachloride.

Specifically, in the present disclosure, thiols, that is, organic mercaptan-based molecular weight regulator including one or more thiol groups (—SH), are useful, and examples thereof may include aliphatic mercaptans, cycloaliphatic mercaptans, or aromatic mercaptans.

The mercaptan based materials may include 1 to 4 thiol groups per molecule, and 1 to 20 carbons, preferably 1 to 15 carbons, per thiol group.

Also, other substituents may further comprise, in addition to the hydrocarbon group and the thiol group, and examples thereof may include a hydroxy group, a carboxylic acid group, an ether group, an ester group, a sulfide group, an amine group, an amide group, etc.

The mercaptan used as the molecular weight regulator in the present disclosure is not particularly limited as long as the mercaptan is an organic compound having a thiol group, and specific examples thereof may include alkyl mercaptans, such as ethyl mercaptan, butyl mercaptan, hexyl mercaptan, or dodecyl mercaptan; thiolphenols, such as phenyl mercaptan or benzyl mercaptan; hydroxy or carboxylic acid group containing mercaptans, such as 2-mercaptoethanol, thioglycolic acid, or 3-mercapto propionic acid; mercaptans having two or more functional groups, such as pentaerythritol tetrakis(3-mercapto) propionate; or mixtures of two or more thereof.

Specific examples of the mercaptans may include, but not limited to, methyl mercaptan, ethyl mercaptan, butyl mercaptan, octyl mercaptan, lauryl mercaptan, mercaptoethanol, mercaptopropanol, mercaptobuthanol, mercaptoacetic acid, mercaptopropionic acid, benzyl mercaptan, phenyl mercaptan, cyclohexyl mercaptan, 1-thioglycerol, 2.2'-dimercaptodiethyl ether, 2,2'-dimercaptodipropyl ether, 2,2'-dimercaptodiisopropyl ether, 3,3'-dimercaptodipropyl ether, 2,2'-dimercaptodiethyl sulfide, 3,3'-dimercaptodipropyl sulfide, bis(β-mercaptoethoxy) methane, bis(β-mercaptoethylthio) methane, trimethylolpropane trithioglycolate, and pentaerythritol tetrathioglycolate.

For example, the molecular weight regulator of the present disclosure includes: ethyl mercaptan, butyl mercaptan, hexyl mercaptan, dodecyl mercaptan; phenyl mercaptan, benzyl mercaptan; mercaptoethanol, thiolglycolic acid, mercapto propionic acid; and pentaerythritol tetrakis(3-mercapto) propionate.

According to an embodiment, the effect of adjusting the molecular weight in the present disclosure may be maximized by using n-dodecyl mercaptan of Formula 1 below, 2-mercaptoethanol of Formula 2, or a mixture thereof as the molecular weight regulator.

[Formula 1]

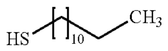

[Formula 2]

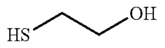

According to an embodiment, a low-viscosity liquid resin having a viscosity (25° C.) of 20-500 cps, for example, 30-500 cps, or 20-450 cps may be used as the viscosity controller.

For example, the low-viscosity liquid resin used in the present disclosure may be selected from hydrogenated DCPD-$C_9$ copolymer resins, hydrogenated DCPD resins, and mixtures thereof.

Here, the hydrogenated DCPD-$C_9$ copolymer resins may refer to white thermoplastic resins obtained by polymerization of dicyclopentadiene (DCPD) and hydrogenation.

According to an embodiment, viscosity adjustment and gas impermeability improving effects may be maximized by using a hydrogenated DCPD-$C_9$ copolymer resin having the following structure as the viscosity controller.

[Formula 3]

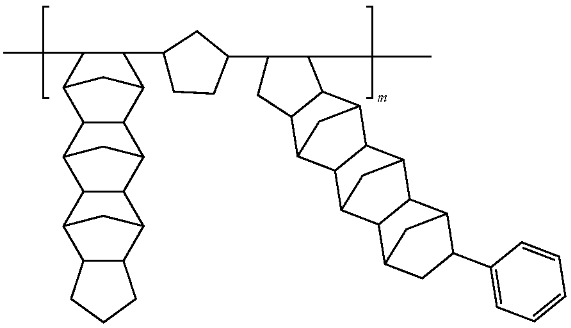

is not modified by the molecular weight regulator, the number average molecular weight may be increased and the glass transition temperature may also rise, resulting in poor compatibility and mixing performance with respect to rubber, and thus the petroleum resin may not be mixed well. Consequently, processability and performance of an end product may be lowered.

According to an embodiment, the modified polymer has a structure in which the molecular weight regulator is coupled to least one of both ends of the petroleum resin that is at least partially hydrogenated or non-hydrogenated by an addition polymerization or chain polymerization reaction.

For example, the petroleum resin may include $C_9$ monomer-derived repeating units, or may consist of $C_9$ monomer-derived repeating units.

According to an embodiment, the petroleum resin has a structure in which repeating units represented by Formula 4a are coupled. For example, the petroleum resin may have the following structure formed from $C_9$ monomers, for example, participating in a polymerization reaction of styrene, α-methylstyrene, vinyltoluene, indene, methylindene, dicyclopentadiene, and alkylated derivatives thereof such as α-methylstyrene, or methylindene:

[Formula 4a]

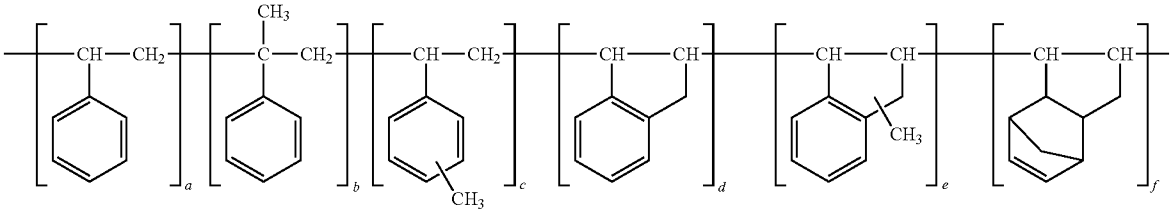

According to an embodiment, the polymerization catalyst used in the present disclosure may be selected from a Lewis acid catalyst, halohydric acid, $AlCl_3$, $BF_3$, and mixtures of two or more thereof.

For example, a Lewis acid catalyst selected from $AlCl_3$, $BF_3$, $SnCl_4$, $TiCl_4$, $AgClO_4$, $I_2$, and mixture of two or more thereof may be used as the polymerization catalyst.

According to an embodiment, the heat addition may be performed by increasing the temperature to 230-280° C.

An aspect of the present disclosure relates to a resin composition comprising a modified polymer having a structure in which a molecular weight regulator is coupled to at least one of both ends of a petroleum resin that is at least partially hydrogenated or non-hydrogenated by a polymerization reaction.

For example, the modified polymer is a polymer modified to the molecular weight regulator from the at least partially hydrogenated or non-hydrogenated petroleum resin, and exhibits excellent compatibility and mixing performance with respect to rubber by modifying the end of the petroleum resin with the molecular weight regulator and is capable of forming a compatibilized film in an amorphous region of polymer, thereby further improving processability and gas impermeability. However, if the end of the petroleum resin The above Formula 4a is represented just by way of example, and one or more $C_5$ monomers derived from $C_5$ fractions, one or more $C_9$ monomers derived from $C_9$ fractions, cyclic diolefin monomers and linear olefin monomers, other than those included in the formula 4a, may be additionally included as the repeating unit.

For example, the petroleum resin is a polymer represented by the above formula, and the polymer may mean a random polymer, including a block copolymer, an alternating copolymer, etc., but not limited thereto.

Although not separately shown, the petroleum resin may have a structure in which at least one of the repeating units represented by Formula 4a is hydrogenated.

According to another embodiment, the petroleum resin may include a structure in which the following repeating units are coupled. For example, the petroleum resin has a structure in which a double bond is positioned on at least one of both ends thereof, and a structure in which a double bond is positioned on both ends thereof is represented by Formula 4b below by way of example:

[Formula 4b]

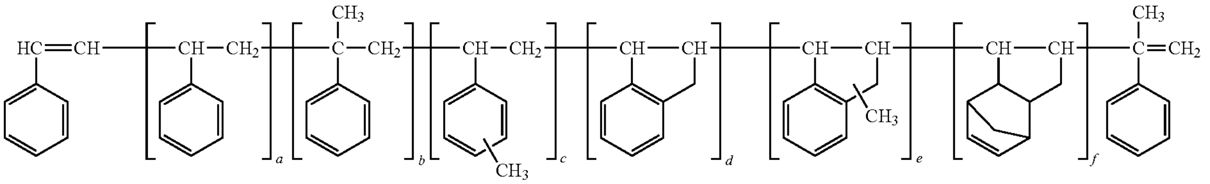

As such, a modified polymer (e.g., a polymer of C9 monomers), which is modified by the molecular weight regulator, is formed by the double bond positioned on at least one end and the molecular weight regulator coupled thereto. The molecular weight regulator may be coupled to both ends of the petroleum resin or may be coupled to any one end thereof, as represented by the following Formula 4c.

Although not separately shown, the modified polymer may have at least one of the repeating units represented by Formula 4b or 4c hydrogenated:

[Formula 4c]

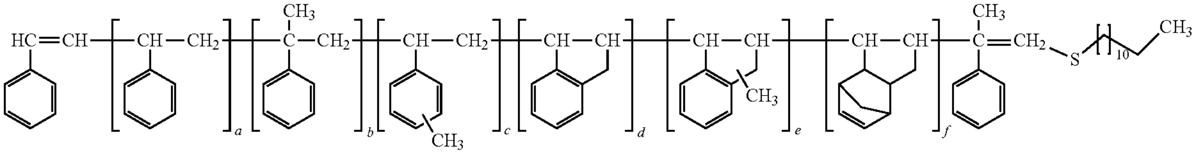

According to an embodiment, the resin composition comprising the modified polymer may have a number average molecular weight (Mn) of 200-500, and a glass transition temperature of −25 to −15° C.

If the number average molecular weight is smaller than 200, mixing efficiency may be lowered, and, if the number average molecular weight is greater than 500, the mixing processability may be lowered. In addition, by having a low molecular weight, the modified polymer exhibits excellent processability, and thus may be applied to a rubber composition for an inner liner in place of conventional process oil, whereby both of processability and gas impermeability can be improved.

According to an embodiment, since the modified polymer is a non-polar polymer, much higher processability is exhibited. In addition, the modified polymer has a low degree of crystallinity, a compatibilized film is formed in an amorphous region of polymer. Accordingly, processability and gas impermeability may be further improved.

In addition, when a glass transition temperature of the petroleum resin is lower than −25° C., the tire inner liner prepared using the resin composition may have unfavorable gas impermeability, and when the glass transition temperature of the petroleum resin is higher than −15° C., there may be a cold crack problem.

An aspect of the present disclosure relates to a resin composition comprising a modified polymer according to various embodiments and a viscosity controller.

According to an embodiment, the resin composition may comprise the modified polymer and the viscosity controller in amounts of 80-98% by weight and 2-20% by weight, respectively.

As stated above, the viscosity controller just function to adjust viscosities of a reactant and a product without participating in forming a structure the modified polymer as a reaction product. Therefore, a polymerization reaction product according to the present disclosure may be obtained by performing a polymerization reaction by adding a polymerization catalyst or/and heat to a solution comprising one or more monomers derived from $C_5$ fractions, one or more monomers derived from $C_9$ fractions, one or more monomers selected from a cyclic diolefin monomer and a linear olefin monomer, a molecular weight regulator, and a viscosity controller. The obtained polymerization reaction product may be a mixture of the modified polymer and the viscosity controller.

According to an embodiment, the resin composition has a viscosity of 2,000-4,000 cps, as measured at 60° C., for example, 2,000-4,000, or 2,500-3,500 cps, and aromaticity of 20% to 60%, for example, 30% to 50% or 35% to 45%.

When the viscosity is greater than 4,000 cps, processability of the rubber composition may be lowered, and when the viscosity is less than 2,000 cps, compatibility with rubber may be insufficient and desired physical properties of a finally produced tire inner liner may not be obtained.

When the aromaticity is less than 30%, segmental mobility may be increased, and thus a gas impermeability improving effect is negligible, and when the aromaticity is greater than 50%, compatibility with raw material rubber is lowered, and thus the gas impermeability improving effect is negligible.

An aspect of the present disclosure relates to a rubber composition comprising raw material rubber and a resin composition according to various embodiments of the present disclosure.

According to an embodiment, on the basis of 100 parts by weight of the raw material rubber, the rubber composition may comprise 5-25 parts by weight of the resin composition.

When the content of the resin composition is less than 5 parts by weight, the gas impermeability improving effect is insufficient, and when the content of the resin composition is greater than 15 parts by weight, mixing performance may be lowered in mixing rubbers in a Banbury mixer, and physical properties of the rubber mixtures may be deteriorated.

According to an embodiment, the rubber composition may comprise, in addition to the modified polymer and the viscosity controller, a raw material rubber, a homogenizing agent, a reinforcing agent, a vulcanization adjuvant, etc., and may further comprise sulfur and a vulcanization accelerator.

Specifically, the rubber composition may comprise, on the basis of 100 parts by weight of the raw material rubber, 1-8 parts by weight of a homogenizing agent, 20-80 parts by weight of a reinforcing agent, and 0.1-10 parts by weight of a vulcanization adjuvant.

In addition, the rubber composition may further comprise, on the basis of 100 parts by weight of the raw material rubber, 0.1-2 parts by weight of sulfur, and 0.5-5 parts by weight of a vulcanization accelerator.

Hereinafter, constituent components forming the rubber composition with the resin composition will be described in detail.

First, the rubber composition of the present disclosure may comprise raw material rubber. The raw material rubber may include any rubber having an olefinic double bond (C—C double bond) without any particular limitation, and natural rubber, synthetic rubber, or a mixture thereof may be used as the raw material rubber.

For example, the raw material rubber is preferably at least one selected from the group consisting of natural rubber (NR), butadiene rubber, nitrile rubber, silicon rubber, isoprene rubber, styrene-butadiene rubber (SBR), isoprene-butadiene rubber, styrene-isoprene-butadiene rubber, acrylonitrile-butadiene rubber (NBR), ethylene-propylene-diene rubber, halogenated butyl rubber, halogenated isoprene rubber, halogenated isobutylene copolymer, chloroprene rubber, butyl rubber, and halogenated isobutylene-p-methylstyrene rubber. More preferably, the raw material rubber is butyl rubber or natural rubber.

The rubber composition of the present disclosure may comprise a homogenizing agent. 40MS may be used as the homogenizing agent, and miscibility of butyl rubber and natural rubber, which are not mixed well, may be improved by adding the homogenizing agent to the mixture.

The rubber composition of the present disclosure may comprise a reinforcing agent. As the reinforcing agent, carbon black may be used. The carbon black produces the effect of improving the wear resistance, improving the rolling resistance characteristic, preventing cracks or aging due to ultraviolet, and so on.

The carbon black that can be used in the present disclosure is not particularly limited, and any carbon black which is commonly used in the field of tires can be used. For example, the carbon black may be carbon black such as furnace black, acetylene black, thermal black, channel black, graphite, and the like.

In addition, physical properties, such as a particle diameter, a pore volume, and a specific surface area of the carbon black, are not particularly limited, and various kinds of carbon blacks, such as SAF, ISAF, HAF, FEF, GPF, and SRF (all of which are abbreviations for carbon black classified according to the ASTM standard D-1765-82a of the United States) which are used in the existing rubber industry can be used properly.

The carbon black is preferably contained in an amount of 20-80 parts by weight, with respect to 100 parts by weight of the raw material rubber. The carbon black is a reinforcing filler and is an essential element for mixing rubbers. If the content of carbon black is less than the above range, the reinforcing effect is reduced. However, if the content exceeds the above range, the carbon black is difficult to disperse.

The reinforcing agent may include, in addition to the carbon black, a powder of minerals, such as silica, clay or talc, carbonates, such as magnesium carbonate or calcium carbonate, and alumina hydrate, such as aluminum hydroxide.

The rubber composition of the present disclosure may include sulfur. The sulfur may be used without any particular limitation as long as it can be used to perform a vulcanization process. From the viewpoint of improvement of the physical properties, the content of sulfur is preferably 0.1-2 parts by weight, with respect to 100 parts by weight of the raw material rubber.

The rubber composition of the present disclosure may include a vulcanization accelerator. As used herein, the term "vulcanization" is used to indicate cross-linkage with at least one sulfur atom added. Examples of the vulcanization accelerator may include: a thiuram-based accelerator, such as tetramethylthiurammonosulfide, tetramethylthiuramdisulfide, or tetraethylthiuramdisulfide; a thiazol-based accelerator, such as N-t-butyl benzothiazol-2-sulfenamide (TBBS), 2-mercaptobenzothiazol, or dibenzothiazyldisulfide; a sulfenamide-based accelerator, such as N-cyclohexyl-2-benzothiazylsulfenamide or N-oxydiethylene-2-benzothiazolylsulfenamide, a guanidine-based accelerator, such as diphenylguanidine (DPG) or diorthotolylguanidine; an aldehyde-amine-based accelerator, such as n-butylaldehyde-aniline condensate or butylaldehyde-monobutylamine condensate; an aldehyde-ammonia-based accelerator, such as hexamethylenetetramine; a thiourea-based accelerator, such as thiocarbanylide. When these vulcanization accelerators are mixed, one type may be used alone, or two or more types may be used in combination. The vulcanization accelerator may include N-t-butyl benzothiazole-2-sulfenamide and diphenylguanidine.

From the viewpoint of improvement of the physical properties, the content of the vulcanization accelerator is preferably 0.5-5 parts by weight, with respect to 100 parts by weight of the raw material rubber.

The rubber composition of the present disclosure may include a vulcanization agent. As stated above, the term "vulcanization" is used to indicate cross-linkage with at least one sulfur atom added.

Examples of the vulcanization agent may include: metal oxides, such as zinc oxide (flowers of zinc) or magnesium oxide; metal hydroxides, such as potassium hydroxide; metal carbonates, such as zinc carbonate or basic zinc carbonate; fatty acids, such as stearic acid or oleic acid; aliphatic metal salts, such as zinc stearic acid or magnesium stearic acid; amines, such as di(n-butyl)amine or dicyclohexylamine; ethylenedimethacrylate, diallylphthalate, N,N-m-phenylene dimaleimide, triallylisocyanuate, or trimethylolpropanetrimethacrylate.

When these vulcanization agents are mixed, one type may be used alone, or two or more types may be used in combination. From the viewpoint of improvement of the physical properties, the content of the vulcanization agent is preferably 0.1-10 parts by weight, with respect to 100 parts by weight of the raw material rubber.

Additionally, the rubber composition according to the present disclosure may contain one or more of various kinds of additives that are commonly used in the field of the rubber industry, for example, an anti-aging agent, a vulcanization retardant, an anti-sticking agent, a plasticizer, etc., as necessary. An amount of these additives mixed is preferably 0.1-10 parts by weight, with respect to 100 parts by weight of the raw material rubber.

The composition including the above-described components is produced as a tire inner liner through a known method.

For example, the rubber composition according to the present disclosure may be prepared by mixing the respective components using a mixer, such as a plastomill, a Banbury mixer, a roll, or an internal mixer. Specifically, it is preferable to mix components other than a crosslinking agent and a vulcanization accelerator, among the above components, to then add the crosslinking agent and the vulcanization accelerator to the obtained mixed product, followed by further mixing.

The rubber composition prepared by the above-described method may be used as a material for constituting a tire inner liner. The thus manufactured tire inner liner has excellent mechanical properties (hardness, tensile strength, modulus, etc.). Specifically, the tire inner liner has excellent gas impermeability, thereby preventing the air from leaking out through the inner liner.

The composition of the present disclosure may be used in preparing rubber specimens, gas permeability may then be measured according to the KS M ISO 2556 method, and the measured gas permeability may be 90 $cm^3/(m^2.day.atm)$ or less, preferably 70 $cm^3/(m^2.day.atm)$ or less.

The rubber specimens may be prepared using the composition of the present disclosure by a method that is commonly used in the art. For example, each of the rubber specimens may be prepared to have a size of 12 cm×12 cm (width×length) and a thickness of 0.5 mm±0.2 mm by a compressive molding method using a hot press, and then gas permeability may be measured at 25° C. under a 60 RH % atmosphere.

The rubber composition of the present disclosure, which is a resin to be used to replace the conventional process oil, comprises the modified polymer and the viscosity controller but does not comprise process oil.

An aspect of the present disclosure relates to a tire inner liner using the rubber composition according to various embodiment of the present disclosure.

An aspect of the present disclosure relates to a tire for a transport apparatus comprising a tire inner liner according to various embodiments of the present disclosure.

An aspect of the present disclosure relates to a transport apparatus, such as an automotive vehicle, comprising a tire according to various embodiments of the present disclosure.

Hereinafter, the present disclosure will be described in greater detail with reference to Examples, and the like, but the scope and content of the present disclosure should not be limited or interpreted by the following examples. In addition, based on the disclosure of the present disclosure including the following examples, it will be apparent that those skilled in the art can easily carry out the present disclosure, the results of which are not specifically presented experimental results, and it is natural that these modifications and modifications belong to the appended claims.

In addition, the experimental results presented below are only representative of the experimental results of the Examples and Comparative Examples, and the effects of each of the various embodiments of the present disclosure not explicitly set forth below will be described in detail in the corresponding sections.

EXAMPLES

Example 1

Preparation of Resin Composition

On the basis of 100 parts by weight of the composition composed of 93% by weight of refined $C_9$ monomer (YCNCC Co., LTD.) and 7% by weight of LP200 (Kolon Industries, Inc.) as a viscosity controller, 2.5 parts by weight of n-dodecyl mercaptan as a molecular weight regulator was added, and a polymerization reaction was conducted at 260° C. under the condition of high pressure (5-10 bar) for 2 hours. When $BF_3$ as a polymerization catalyst is added, the polymerization reaction polymerization reaction was conducted at 180° C. under the condition of high pressure (5-10 bar) for 2 hours. After the polymerization was completed, the polymerization product was subjected to a degassing step to remove unreacted reactants, thereby preparing the resin composition.

Test Example 1

Measurement of Aromaticity

The aromaticity of the resin composition prepared in Example 1 was measured, and the measurement result confirmed that the aromaticity was 38.7%. The aromaticity was measured and analyzed by NMR.

Example 2

Preparation of Rubber Specimen 100 parts by weight of raw material rubber including 80 parts by weight of chlorobutyl rubber HT-1066 (manufactured by Exxon Chemicals) and 20 parts by weight of natural rubber (NR) (manufactured by Sritrang), and 10 parts by weight of the resin composition prepared in Example 1, 4 parts by weight of a homogenizing agent 40MS (manufactured by Strucktol), 60 parts by weight of carbon black N-660 (manufactured by Pentacarbon), 3 parts by weight of zinc oxide (ZnO) (manufactured by Kemai Chem), and 2 parts by weight of stearic acid (manufactured by Kemai Chem) were input to a Banbury mixer, and mixed at 150° C., followed by releasing primarily mixed rubber. Then, 0.5 parts by weight of sulfur (manufactured by Miwon Chem.) and 1.2 parts by weight of dibenzothiazole disulfide (DM) as a vulcanization adjuvant (manufactured by Sunshine) were added to the primarily mixed rubber, input to the Banbury mixer, and then vulcanized at 100° C., followed by releasing, thereby preparing the rubber specimen.

Comparative Example 1

A rubber specimen was prepared in the same manner as above, except that, instead of 10 parts by weight of the resin composition prepared in Example 1, 10 parts by weight of process oil TDAE (manufactured by H&R) was added.

Comparative Example 2

A rubber specimen was prepared in the same manner as above, except that, instead of 10 parts by weight of the resin composition prepared in Example 1, 10 parts by weight of paraffinic oil (manufactured by Michang Petroleum) was added.

Comparative Example 3

A rubber specimen was prepared in the same manner as above, except that, instead of 10 parts by weight of the resin composition prepared in Example 1, 10 parts by weight of napthenic oil (manufactured by Michang Petroleum) was added.

Comparative Example 4

A rubber specimen was prepared in the same manner as above, except that, instead of 10 parts by weight of the resin composition prepared in Example 1, 10 parts by weight of an additive 40MS (manufactured by Strucktol) was added.

Test Example 2

Measurement of Physical Properties of Rubber Specimens

Various physical properties of the rubber specimens prepared in Example 2 and Comparative Examples 1 to 4 were measured, and the results thereof are summarized in Table 1.

| Physical property | | Example 2 | Comparative Example 1 | Comparative Example 2 | Comparative Example 3 | Comparative Example 4 |
|---|---|---|---|---|---|---|
| Rheometer[1)] | Toq (Max) | 11.3 | 11.2 | 12.5 | 11.7 | 12.6 |
| | Toq (Min) | 2.3 | 2.3 | 2.1 | 2.2 | 2.8 |
| | Tc50 | 5:25 | 5:44 | 6:00 | 6:12 | 6:57 |
| | Tc90 | 8:42 | 9:33 | 9:55 | 10:10 | 11:06 |
| Mooney viscosity[2)] | 100° C. | 64 | 69 | 62 | 63 | 75 |
| | 125° C., T05 | 33:55 | 33:58 | 31:34 | 38:33 | 39:33 |
| UTM properties[3)] | Hardness | 46 | 47 | 47 | 46 | 50 |
| | 100% modulus | 19 | 20 | 22 | 20 | 25 |
| | 300% modulus | 56 | 60 | 66 | 59 | 63 |
| | Tensile strength (T.S.) | 112 | 115 | 115 | 114 | 119 |
| | Elongation at break (E.B.) | 645 | 631 | 563 | 624 | 621 |
| Gas permeation amount ($cm^3/(m^2 \cdot day \cdot atm)$) | | 141 | 184 | 236 | 204 | 170 |

Note[1)]

Rheometer: MDR 2000E (Monsanto; St. Louis, Mo.) was used in measuring a rheometer according to ASTM D 5289.

Note[2)]

Mooney viscosity: Specimens having a size of 25 ± 3 $cm^3$ were prepared to then be placed in a chamber, and Mooney viscosity was measured using a Mooney viscometer MV-2000 (LABTECH) while changing the temperature to 30-200° C.

Note[3)]

UTM properties: According to ASTM D412, U.T.M - Shimadzu AG-1S (Load cell: PFG-5kN) measuring instrument was used in measuring the physical property by applying tension of 500 mm/min.

Note[4)]

Gas permeability: According to KS M ISO 2556: 2006, an oxygen permeation analyzer (Model BT-3, manufactured by Toyoseiki) was used in measuring the gas permeability at 25° C. under 60 RH % atmosphere.

Rheometer results, measured by a rubber rheometer, are parameters related to the curing rate and the behavior of the rubber composition during process application, and are related to processability in tire manufacturing. Here, when the value (Toq(Min), Toq(Max)) is extremely high or low, it is not easy to apply to the existing process, which means that a new process design is required.

As compared with the results of Comparative Examples 1 to 4, it is confirmed that the results of Toq(Min), Toq(Max), Tc50 (the time taken to reach 50% curing), Tc90 (the time taken to reach 90% curing), etc. presented in Table 1 correspond to the specification that can be easily applied to an existing process.

In addition, as indicated in Table 1, the results of Mooney viscosity and mechanical properties (modulus, tensile strength, elongation, hardness, etc.) of Example 2 were also equivalent to or superior to those of Comparative Examples 1 to 4.

Specifically, as compared with gas permeability values of Comparative Examples 1 to 4, which are 184, 236, 204, and 170 $m^3/(m^2.day.atm)$, the gas permeation amount of Example 2 is 141 $cm^3/(m^2.day.atm)$, confirming that Example 2 showed significantly improved gas impermeability, compared to Comparative Examples.

From these results, it is confirmed that the composition for the tire inner liner according to the present disclosure satisfies basic physical properties required in constituting a tire, including tensile strength, wear resistance, durability, hardness, etc., and both of processability and gas impermeability can be markedly improved.

What is claimed is:

1. A resin composition comprising a modified polymer having a structure in which a molecular weight regulator is coupled to at least one of both ends of an at least partially hydrogenated or non-hydrogenated petroleum resin, wherein the resin composition further comprises a viscosity controller, and wherein the viscosity controller is a low-viscosity liquid resin having a viscosity (25° C.) of 20-500 cps, and wherein the low-viscosity liquid resin is selected from hydrogenated DCPD-$C_9$ copolymer resins, hydrogenated DCPD resins, and mixtures thereof.

2. The resin composition of claim 1, wherein the petroleum resin comprises a $C_9$ monomer-derived repeating unit.

3. The resin composition of claim 2, wherein the $C_9$ monomer-derived repeating unit comprises vinyltoluene, α-methylstyrene, styrene, dicyclopentadiene, indene, and methylindene.

4. The resin composition of claim 1, wherein the molecular weight regulator is selected from ethyl mercaptan, butyl mercaptan, hexyl mercaptan, dodecyl mercaptan, phenyl mercaptan, benzyl mercaptan, mercaptoethanol, thioglycolic acid, mercapto propionic acid, pentaerythritol tetrakis(3-mercapto) propionate, and mixtures of two or more thereof.

5. The resin composition of claim 1, wherein the resin composition has a number average molecular weight of 200 to 500, and a glass transition temperature of −25 to −15° C.

6. The resin composition of claim 1, wherein the resin composition has a viscosity of 2,000-4,000 cps, as measured at 60° C., and aromaticity of 30% to 50%.

7. The resin composition of claim 1, wherein the resin composition comprises 80-98% by weight and 2-20% by weight of the modified polymer and the viscosity controller, respectively.

8. A rubber composition including a raw material rubber and the resin composition according to claim 1, the rubber composition comprising 5-25 parts by weight of the resin composition, on the basis of 100 parts by weight of the raw material rubber.

9. The rubber composition of claim 8, wherein the rubber composition comprises, on the basis of 100 parts by weight of the raw material rubber, 1-8 parts by weight of a homogenizing agent, 20-80 parts by weight of a reinforcing agent, and 0.1-10 parts by weight of a vulcanization adjuvant.

10. The rubber composition of claim 8, wherein the rubber composition comprises, on the basis of 100 parts by weight of the raw material rubber, 0.1-2 parts by weight of sulfur, and 0.5-5 parts by weight of a vulcanization accelerator.

11. The rubber composition of claim 8, wherein the rubber composition, after being prepared as a rubber specimen, has gas permeability of 90 $cm^3/(m^2.day.atm)$ or less, as measured by a KS M ISO 2556 method.

* * * * *